April 23, 1968     C. E. DEARDORFF ETAL     3,378,929
MEASURING DEVICE Original Filed Oct. 23, 1961     3 Sheets-Sheet 1

FIG_1.

INVENTORS.
CLINTON E. DEARDORFF
EDWARD J. WILLIAMS
BY
Christie, Parker & Hale
ATTORNEYS.

April 23, 1968  C. E. DEARDORFF ET AL  3,378,929
MEASURING DEVICE
Original Filed Oct. 23, 1961  3 Sheets-Sheet 2

FIG. 2

INVENTORS.
CLINTON E. DEARDORFF
EDWARD J. WILLIAMS
BY
Christie, Parker & Hale
ATTORNEYS.

April 23, 1968     C. E. DEARDORFF ETAL     3,378,929
MEASURING DEVICE

Original Filed Oct. 23, 1961     3 Sheets-Sheet 3

FIG_5_

FIG_4_

FIG_3_

INVENTORS.
CLINTON E. DEARDORFF
EDWARD J. WILLIAMS
BY
ATTORNEYS.

United States Patent Office 3,378,929
Patented Apr. 23, 1968

3,378,929
MEASURING DEVICE
Clinton E. Deardorff and Edward John Williams, Woodland Hills, Calif., assignors to Primus Mfg., Inc., San Lorenzo, Puerto Rico, a corporation of California
Continuation of application Ser. No. 147,012, Oct. 23, 1961. This application Jan. 3, 1967, Ser. No. 622,837
8 Claims. (Cl. 33—125)

ABSTRACT OF THE DISCLOSURE

Improvements in and for a friction-wheel distance measuring device of the type described in U.S. Patent 3,311,985 are described. The improvements include a resettable coarse-reading visual indicator mounted to a metering wheel shaft, the coupling of the coarse-reading indicator to the shaft permitting this indicator to be reset or zeroed while the metering wheel and measurement surface along which the wheel rolls are engaged without causing the metering wheel to slip relative to the measurement surface. An improved anti-backlash system for the motion amplifying gear train, viz., the use of parallel gear trains and a single anti-backlashing spring, is also described, as is an improved mounting mechanism for the housing of the device. The mounting mechanism includes a tongue-and-groove type connection between the housing and the mounting mechanism and a spring biased lug engaged with the housing itself essentially directly along the line of the tongue-and-groove connection so that the housing cannot move relative to the mounting mechanism independently of the biasing mechanism but arranged so that the housing may be removed readily from the mounting mechanism when desired.

Cross references to related applications

This application is a continuation of application Ser. No. 147,012 filed Oct. 23, 1961, by Clinton E. Deardorff and Edward J. Williams. The measuring device in which the improvements described by this invention have their principal utility is described in copending, commonly-owned application Ser. No. 575,209 filed Aug. 2, 1966, by Merville E. Hodge for Friction Wheel Measuring Apparatus, now issued as U.S. Patent 3,311,985, such application being a continuation-in-part of application Ser. No. 359,538 filed Mar. 11, 1965, now abandoned, which application in turn was a continuation-in-part of now abandoned application Ser. No. 153,250 filed Nov. 13, 1961, as a continuation-in-part of application Ser. No. 784,834 filed Dec. 16, 1958, now abandoned.

Background of the invention

*Field of the invention.*—This invention relates to apparatus for measuring movement along a surface such as the relative movement of a first member along the surface of a second member. The invention has particular reference to a measuring accessory which incorporates a friction drive wheel adapted to be engaged in rolling contact with the surface along which measurements are to be made.

Environment of the invention and prior art

The accessory of the invention is intended primarily for use on machine tools where, in response to relative travel between first and second guiding members of the machine tool, the apparatus provides, for example, a measurement of the relative travel between the cutting member of the machine tool and the work being machined. Examples of such machines are engine lathes, milling machine, shaving machines, drill presses, etc. Practically all machine tools include a pair of guiding members, one of which moves relative to the other to produce relative travel between the cutting member and the work. For example, such a pair of guiding members may be the carriage and bed of a planing machine. Another such pair of guiding members may be the carriage and the cross-feed on the carriage of an engine lathe. These guiding members usually have one or more flat machine surfaces extending along the direction in which they move relative to one another.

Prior to this invention, resort was had to micrometers and rod-actuated indicators of limited range precision measurements. Expensive semi-permanent installations for extended range precision measurements are required with such devices. For example, in the case with micrometers, stops are normally positioned between the moving surfaces of the machine. An internal or external micrometer is used to accurately measure the distance between these stops in order to properly position the work piece relative to the cutting head. Plunger-rod actuated dial indicators may be used where only a very small amount of travel occurs. The limitation with such methods of measuring relative travel between elements of a machine tool is that time-consuming and usually dimensionally unstable mounting sare required to properly utilize such limited range indicators.

Because of the limitations inherent in the use of micrometers and dial indicators, there has long existed a need for a compact measuring instrument capable of providing an accurate direct reading to within one-thousandth of an inch. This instrument should have an unrestricted range of movement and be easy to install on existing machine tools. It is extremely desirable, in fact in many cases mandatory, that the device be capable of transfer from one machine tool to another. The need for such versatility in use is especially prevalent in the small machine shop where capital is not available to provide such measuring devices on each tool in the shop. For many years great expectations were held for solving the problem by means of a friction wheel type of measuring device, but no such friction wheel device has ever been produced which provides all the requisite requirements and features. Not until the provision of this invention has it been possible to achieve sufficient accuracy and reliability in a friction wheel measurement device.

Several opposing factors influence and affect the proper design and assembly of the apparatus required in such a friction wheel measuring instrument. The instrument must be small in dimensions in order to be properly mountable and usable in the great majority of applications. Directly opposed to this consideration is the fact that the smaller a part is made, the more significant becomes any error inherent in its dimensions, particularly when it is required that the main friction wheel of the device make one or more revolutions. Additional components of the apparatus, such as gears, make many more revolutions during such travel than does the main friction wheel. If any inaccuracies are present in the components, these inaccuracies are cumulative over the total range of travel of the device and are manifested as a total error. Devices known heretofore have not been able to provide an apparatus which eliminates or minimizes such cumulative error to an acceptable level. This invention, on the other hand, by a novel combination of elements oriented in a novel manner, provides a friction wheel device which successfully meets the requirements as to size and yet which does not sacrifice the accuracy of the device. For example, in a six-inch travel of the device, the total cumulative error is less than one-thousandth of one inch. This is a standard which has heretofore not been achievable in any device known.

Additional factors influencing the failure of devices known heretofore to provide the requisite accuracy reside in the manner of mounting such devices. In this invention, it is recognized, probably for the first time, that the mounting of the instrument relative to the surface along which travel is to be measured is extremely critical. If mounting techniques and apparatus are not adequate, regardless of how accurate the instrument itself may be, the indications provided by the instrument will be erroneous and unacceptable. This invention, therefore, in addition to providing a novel combination of elements in the instrument itself, provides a novel mounting apparatus for the device which assures accurate performance of the instrument. This mounting apparatus is such as to assure proper alignment of the device with the surface to be measured. The mounting also provides for rapid and simple demounting of the instrument relative to a given surface so that the instrument may be transferred to a separate installation for use in measuring the travel relative to a second surface. In order to so use the instrument, it is necessary only that a plurality of mountings be provided. Each of these mountings can be adapted to the particular problems of the machine tool to which the instrument is to be attached. Once the mountings are so positioned, the instrument may be directly interchangeable between many machine tools.

Summary of the invention

Generally speaking, this invention provides improvements in a precision machine tool accessory for accurately measuring the distance the first member of the machine tool moves with respect to the surface of a second member of the machine tool. The accessory includes a rigid protective housing and a metering wheel rotatably mounted in the housing with its periphery extending outwardly of the housing for frictional engagement with the surface of the second member of the machine tool. First and second indicating means are mounted to the housing and are operably connected to indicate rotation of the metering wheel. An improvement provided by the present invention comprises in combination, a first shaft rotatably mounted within the housing for suporting the metering wheel in the housing and extending exteriorly of the housing, a wheel rotation indicator mounted to the exterior end of the shaft, and resilient coupling means disposed between the shaft and the wheel rotation indicator. The indicator comprises the first indicating means of the accessory. A second improvement provided by the present invention comprises an anti-backlash gear train means interconnecting the wheel and the second indicating means. The anti-backlash gear train means includes a second shaft rotatably mounted within the housing and connected to the second indicating means, and a pair of similar gear trains connected between the shafts. One of the gears connected to the first shaft is movable angularly relative to such shaft. Resilient means are provided for biasing the angularly movable gear, and the gear train of which such gear is a part, against the other gear train. The resiliently biasing means assure that rotation of the second shaft relates exactly to rotation of the first shaft as determined by the relation of the gears in the pair of gear trains. In conjunction with the second indicating means, means are mounted between such indicating means and its shaft for setting and resetting the second indicating means without movement of the second shaft. Additionally, the invention comprises improved means for mounting the accessory to the first machine tool member, which means includes a member defining a channel in which an elongated straight protrusion means of the housing is slidably engageable. The mounting further includes lugged means engageable between the channel member and the accessory and resilient means biasing the lugged means relative to the channel member to maintain a predetermined engagement force between the wheel and the surface of the second machine tool member, the channel member being mounted adjacent the second machine tool part.

Brief description of the drawing

The above-mentioned and other features and objects of this invention will be more completely understood by reference to the following detailed description and explanation of the invention taken in conjunction with the accompanying drawings, wherein.

Description of the preferred embodiments

Figure 1:
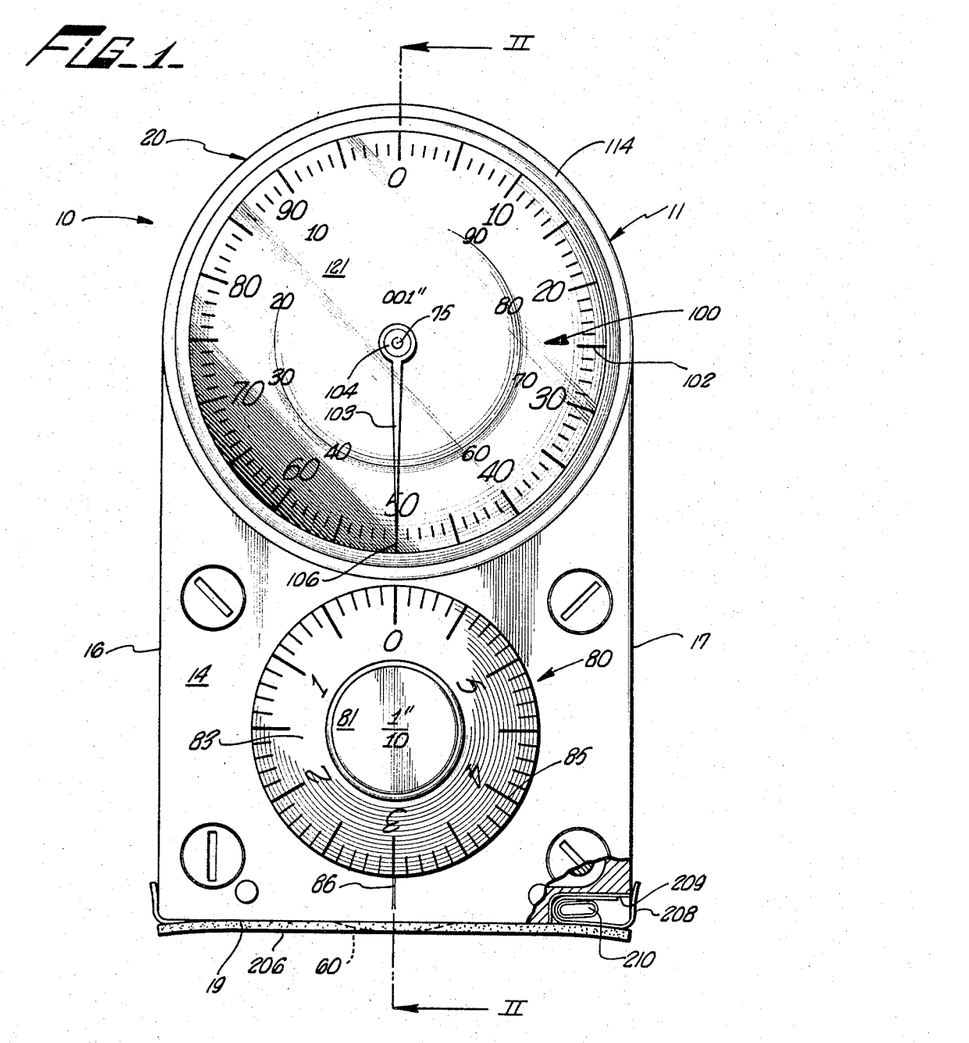
FIG. 1 is a top plane view of the friction wheel measuring accessory.
Figure 2:
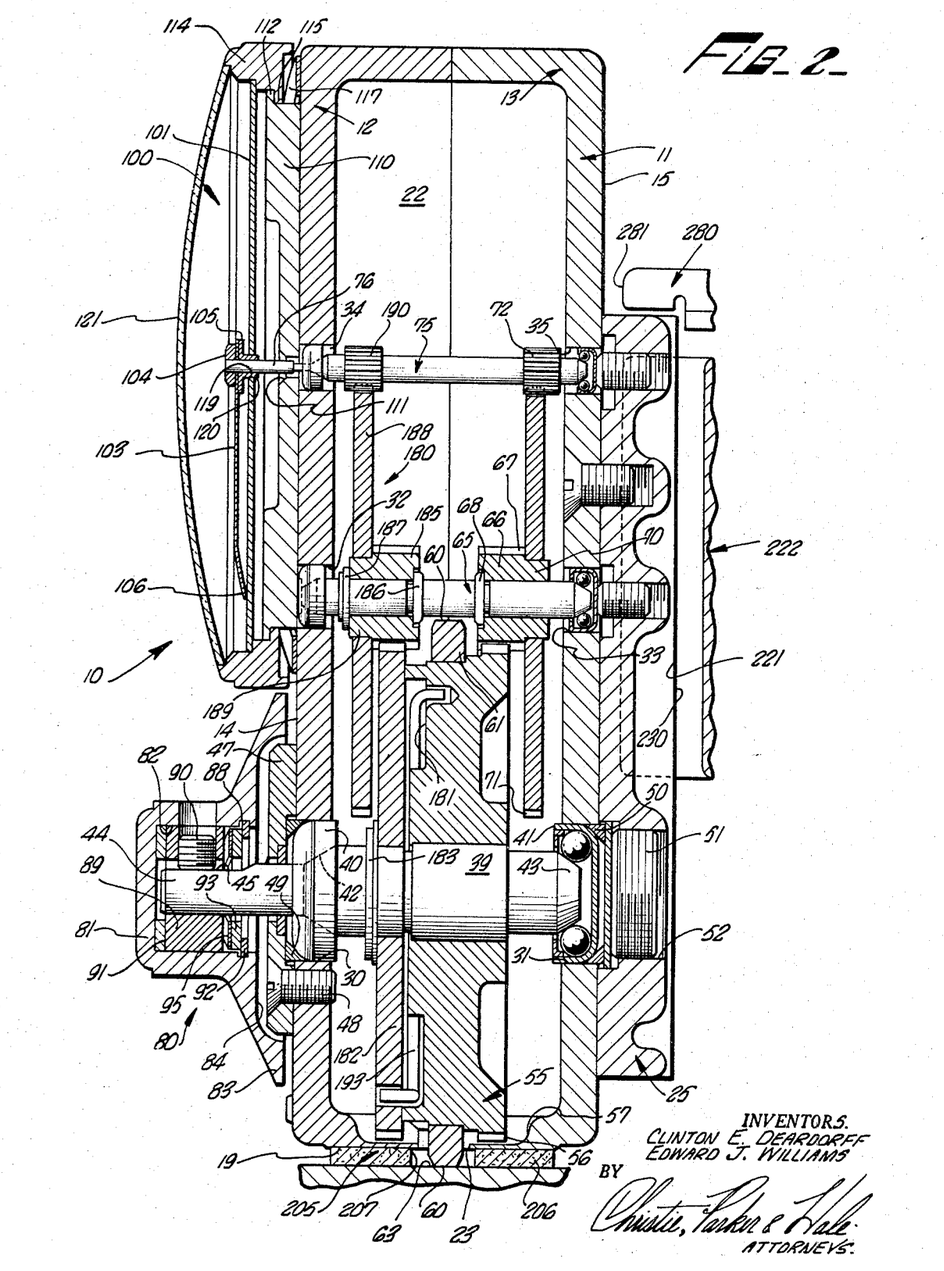
FIG. 2 is an enlarged longitudinal cross section of the accessory taken along line II—II of FIG. 1.

Referring to FIGS. 1 and 2, the accessory 10 has an elongated, substantially rectangular housing 11. The housing 11 is defined by an upper portion 12 and a lower portion 13. The external portions of the housing have substantially parallel upper 14 and lower 15 faces. A pair of substantially parallel vertical side walls 16 and 17 extend from a front face 19 rearwardly to a semicircular rear end portion 20. The housing 11 defines an internal cavity 22 within which is enclosed a portion of the apparatus of the accessory. An opening 23 is provided in the front face 19 of the housing 11 and provides communication between the internal cavity 22 and the exterior of the accessory 10. A back plate 25, defining a rigid guide protrusion for the housing, is secured to the undersurface 15 of housing 11 by screws 26 threaded from the cavity 22 through the lower housing member 13 into the back plate 25. Such a manner of securing the back plate 25 to the housing 11 limits undesired removal and tampering with the structure of the accessory 10.

A pair of axially aligned, substantially equi-diameter apertures or holes 30 and 31 are drilled in the upper and lower housing members 12 and 13, respectively. The axis of the apertures 30 and 31 is parallel to the front face 19 of the housing 11. A second pair of coaxially oriented, substantially equi-diameter apertures 32 and 33 are drilled through the upper and lower housing members 12 and 13 respectively, in a location spaced from the first pair of apertures 30 and 31. The axis of the apertures 32 and 33 is parallel to the axis of apertures 30 and 31. A third pair of apertures or holes 34 and 35 are drilled through the upper 12 and lower 13 housing members, respectively; the axis of this pair of apertures is aligned with the axis of the pair of apertures 32 and 33. The apertures 34 and 35 are spaced rearwardly from the second pair of apertures. Preferably the axes of the first, second, and third pairs of apertures are aligned with one another in a plane perpendicular to the front face 19 of the housing 11. Further, it is preferably that the diameters of the first, second and third pairs of apertures become successively smaller progressing toward the rear portion 20 of housing 11.

A main or primary shaft 39 is aligned in the first pair of apertures 30 and 31 coaxially of the axis of these apertures. Self-centering and self-seating bearings 40 and 41, preferably of the ball type, are engaged in apertures 30 and 31, respectively, and engage a pair of tapered shoulders 42 and 43 of shaft 40. Shoulder 43 forms the lower end of shaft 39. Shaft 39 projects beyond the upper shoulder 42 in a reduced diameter upper extension 44 projecting beyond the upper surface 14 of the housing 11. A flat portion or setscrew land 45 is provided in the upper extent of the reduced diameter portion 44 of shaft 39. A retainer plate 47 is engaged against the upper surface 14 and is secured to the housing 11 by screw means 48. An internally chamfered spacer washer 49 is engaged between the underside of the retainer plate 47 and the bearing 40 to securely engaged the balls of bearing 40 against the shoulder 42. Similarly, a spacer washer 50 is engaged in the lower aperture 31 and is positioned relative to the bearing 41 by an adjustment and setscrew 51 threaded into an aperture 52 of the backplate 25.

A first or main reduction gear 55 is connected to the first shaft 39 internally of the housing 11. The gear 55 is secured from rotational displacement relative to the shaft 39. In FIG. 2, the gear 55 is shrunk or force fitted onto the shaft 39; however, it is within the scope of this invention that the gear 55 may be formed integral with the shaft 39. The diameter of the gear 55 is such that the teeth 56 thereof just clear the front wall of the housing because of a recess 57 provided on the interior side thereof to accommodate gear teeth 56. It is especially desirable that the diameter of the first reduction gear 55 be as large as possible in relation to the dimensions of the housing 11. The reasons for this dimensional relationship will be explained below.

A precision diameter contact surface 60 is disposed concentric to the shaft 39. As illustrated in FIG. 2, the contact surface 60 is formed on the external periphery of a contact tire 61. The contact tire is shrunk or force-fitted onto the hub of gear 55. It is not required, however, that such a construction technique as illustrated be utilized for it is within the scope of this invention that the contact surface 60 may be formed on a wheel integral with the shaft 39. Also, contact tire 61 can be force-fitted or shrunk onto the shaft 39 independently of the gear 55.

The diameter of the contact surface 60 is such that it protrudes through the opening 23 in the front face 19 of housing 11. When the accessory 10 is in operation, contact surface 60 makes contact on a measurement surface 63 of a machine tool, or any other element to be measured. By "measurement surface" is meant the surface relative to which travel of the accessory 10 is to be measured.

An intermediate shaft 65 is rotatably mounted in the second pair of housing apertures 32 and 33. The axis of shaft 65 is maintained coaxial with the predetermined axis of apertures 32 and 33. Since the manner of mounting and bearing the shaft 65 is similar to the manner of mounting shaft 39, further detail as to shaft 65 will not be made at this point. The ends of the shaft 65 do not project beyond the upper and lower surfaces 14 and 15, respectively, of housing 11. A first pinion or small-diameter gear 66 is mounted on shaft 65 and is secured from angular displacement relative thereto. As illustrated in FIG. 2, gear 66, having teeth 67 engaging the teeth 56 of gear 55, is shrunk or force-fitted to the shaft 65. A radial shoulder or flange 68 is provided on shaft 65 to position the gear 66 axially of the shaft 65.

A second reduction gear 69 is mounted for rotation about the axis of shaft 65. As illustrated in FIG. 2, the second reduction gear 69 is shrunk or force-fitted onto a hub 70 of the first pinion 66. An equivalent and alternative form of the gear combination 66 and 69 would be to provide an integral gear combination, or to mount the gear 69 directly to shaft 65.

The gear 69 has teeth 71 which engage a second pinion 72 secured from angular displacement relative to a secondary shaft 75. Shaft 75 is mounted so as to be axially aligned with the axis of the apertures 34 and 35. The gear 72 preferably is formed integral with shaft 75. The mounting and bearing assemblies for shaft 75 are similar to those of shafts 39 and 65 and hence the description of those similar elements relating to shaft 39 will suffice at this point. It should be noted, however, that shaft 75 has an elongated reduced diameter portion 76 which extends to beyond the upper surface 14 of housing 11. The gear train described and comprised of gears 55, 66, 69 and 72 provides a speed step-up from shaft 39 to shaft 75 with the result that angular motion of tire 61 is amplified at shaft 75.

A pair of measurement indicators 80 and 100, associated with the main 39 and secondary 75 shafts, respectively, are located on the upper surface 14 of housing 11. Each measurement indicator is comprised of a dial having a scale thereon, a scale referencer, and a scale indexer. The scale referencer is the element of the measurement indicator against which the scale is read or compared to determine the reading indicated thereby. The scale indexer, on the other hand, is the means which serves to provide relative movement between the scale and the scale referencer.

The main or primary shaft measurement indicator 80 includes a cap 81 having a downwardly open interior cavity 82. The cap has a peripheral radial flange 83 at its lower end. The cap 82 further has a recess 84 in the underside thereof providing clearance relative to the retainer plate 47. A scale 85 is engraved, stenciled, or otherwise marked on the flange 83 of cap 81. A scale referencer mark 86 is engraved on the upper surface 14 of the housing 11. Preferably the scale referencer 86 lies along the longitudinal center line of the accessory 10. In the primary measurement indicator 80 the scale indexer is the cap 81 providing relative motion between the scale 85 and the scale referencer 86.

A clutch mechanism is provided internally of cap 81. An internal annular groove 88 is formed in the lower extent of the cap cavity 82. An axially bored collar 89 is secured to the upper extension 44 of shaft 39 by a setscrew 90 threaded transversely thereof. The setscrew 90 engages the flat setscrew land portion 45 and is contained wholly within the collar 89, i.e., the diameter of the collar 89 is such that it is less than the internal diameter of the cap cavity 82. A washer 91 is fitted between the upper end of the collar 89 and the upper transverse extent of the cap cavity 82. A spring retainer ring 92 is engaged within the annular recess 88 and supports a second washer 93.

A resiliently biased wave-washer 95 is engaged between the upper side of the second washer 93 and the underside of the collar 89. The wave-washer 95 has such inherent resiliency to provide a frictional bias or contact between the retainer ring 92 and the collar 89 and permits frictional rotational movement between these elements. This construction allows the cap 81 to be rotated relative to the shaft 39. However, rotation of the shaft 39, because of the frictional engagement produced by wave-washer 95, normally means that the cap 81 follows the rotation without lost motion. The import of the provision of the clutch mechanism will be explained in detail below.

A secondary measurement indicator 100 is associated with the secondary shaft 75 adjacent the rear portion 20 of the housing 11. Measurement indicator 100 includes a dial 101 of generally circular nature having a scale 102 imprinted around its periphery. A pointer or indicator hand 103 is secured to the upper extension 76 of shaft 75 by a pair of washers or retainers 104 and 105. In the secondary measurement indicator 100, the tip 106 of the indicator pointer 103 comprises the scale referencer, while the shaft 75 and pointer hand 103, in combination, comprise the scale indexer.

A bezel ring retainer plate 110 is secured to the upper face 14 of housing 11. The bezel retainer 110 has a central aperture 111 through which the extension 76 of shaft 75 projects. It also has a radial flange 112 peripherally thereof at its upper extent remote from the housing 11. A bezel ring 114 is engaged with the bezel retainer 110 by means of an inner peripheral flange 115 engaged with the underside of the bezel plate flange 112. A wave-washer 117 is engaged against the upper surface 14 of the housing 11 and biases the bezel ring 114 against the bezel retainer plate 110.

The dial plate 101 is mounted to the bezel ring 114. To accommodate the upper portion of shaft 75, the dial plate 101 has a central aperture 119 within which a depending cylindrical portion 120 of the lower pointer retainer 105 cooperates. The cylindrical portion 120 effectively journals and fixes the upper end or extension 76 of shaft 75 from vibration. A transparent crystal 121 is secured to the upper limit of the bezel ring 114 to protect the dial and pointer combination from damage and to prevent dirt from getting into the operative portions of the accessory 10.

In the apparatus described thus far, the rotary motion transformation ratios, otherwise known as gear ratios, between the main shaft 39 and the secondary shaft 75 is 1:10N. The circumference of the contact surface 60 is N measuring units in length. In a preferred embodiment of the invention, the circumference of surface 60 is very closely held to six inches in length. As is illustrated particularly in FIGURE 1, the cap 81 associated with the primary measurement indicator 80 has six major scale divisions, each major scale division being subdivided into tenths. The scale on cap 81 thus corresponds to inches and tenths of one inch. The 1:10N, in this case 1:60, gear ratio between the main and secondary shafts 39 and 75, respectively, provides that the pointer 103 of the secondary measurement indicator 100 makes one complete revolution for every 1/10N (1/60) revolution of shaft 39. Accordingly, the dial for scale 102 of the secondary measurement indicator 100 is subdivided into ten major divisions with each major division being further subdivided into tenths. Therefore, travel of pointer tip 105 past each minor subdivision of the scale 102 corresponds to one thousandth of an inch (0.001") travelled by the precision tracking surface 60 along a measurement surface 63. To accomplish these ends in the most effective manner, the gear ratio between the first reduction gear 55 and the first pinion 66 is 1:N, or in this case, 1:6. The gear ratio between the second reduction gear 69 and the second pinion 72 is 1:10. Thus, for every complete revolution of shaft 39, shaft 75 will rotate sixty times.

Figure 3:
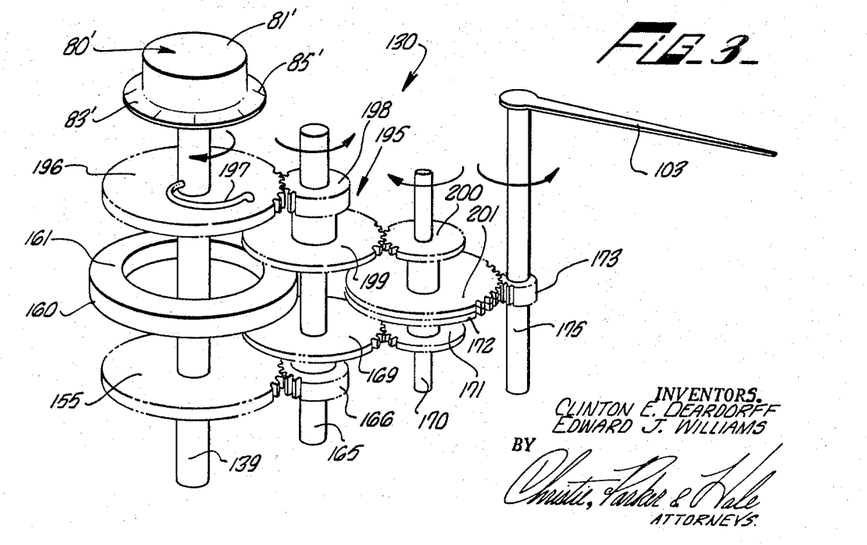
FIG. 3 is a perspective representation of the gears, shafts, and contact surface of a metric measuring accessory.

The apparatus illustrated and described thus far (FIGS. 1 and 2) corresponds to a device especially adapted for the English system. A metric device, illustrated schematically in FIG. 3, is also within the scope of this invention. The metric apparatus 130 has a primary shaft 139 upon which a first reduction gear 155 is secured from angular displacement. A contact surface 160, forming the outer peripheral surface of a tire 161, is secured for rotation with shaft 139. In FIG. 3, the contact tire 161 is disposed concentrically with the shaft 139 in order to facilitate illustration. A first intermediate shaft 165 has a first pinion 166 secured thereto so as not to suffer angular displacement relative to the shaft 165. A second reduction gear 169 is also secured to shaft 165 and, as illustrated, is a portion of the first pinion 166. A second intermediate shaft 170 (the third shaft in housing 11) has a second pinion 171 disposed concentric thereto in a manner to be secure from angular displacement relative to shaft 170. As illustrated in FIG. 3, a third reduction gear 172 is fabricated as a portion of the second pinion 171 and engages a third pinion 173 secured to the secondary shaft 175, to which a pointer 103 is attached at its upper end.

A cap 81′, identical in construction to cap 81 of FIG. 2, is secured to the upper end of the primary shaft 139. In order to be consistent with the usages for which the metric device 130 is intended, the scale 85′ fixed to the flange 83′ of cap 81′ is in metric units correlated to the circumference of the contact surface 160.

In the preferred form of the metric instrument 130, the major subdivisions of scale 85′ correspond to centimeters with the subdivisions of the major divisions of scale 85′ signifying millimeters, i.e., there are ten minor subdivisions for each major subdivision of scale 85′. Ideally, there are ten major subdivisions on the circumference of scale 85′.

A 100:1 gear ratio is preferred between shafts 139 and 175. Accordingly, gear 155 has a pitch diameter five times that of first pinion 166. Similarly, in the preferred metric instrument 130, the second reduction gear 169 has a pitch diameter five times that of the second pinion 171. The pitch diameter of the third reduction gear 172 is four times that of the third pinion 173 on shaft 175. In view of these gear ratios, the pointer 103 on shaft 175 makes one hundred (100) revolutions for every revolution of cap 81′ associated with the first measurement indicator 80′.

Referring now to FIGURE 2, a backlash system 180 is provided between shafts 39 and 75. In the foregoing portions of this description and explanation of the invention, it was mentioned that it is particularly desirable to have the shafts 39, 65, and 75 free-running or easily rotatable in their mounting and bearing apparatus. It is also desirable that the gears 55, 66, 69, and 72 mesh easily without binding in order that inherent friction in the apparatus of the instrument 10 be reduced as far as possible. Too high a friction level inherent in the strument means that it is possible for the contact surface 60 to slip relative to the measurement surface 63 and thereby produce error in the indicated measurements. However, it should be realized that, in order to provide a freely running gear system, a certain amount of play or looseness is inherent in the gear mechanism. Such inherent properties of gears work directly against the requirements of a precision instrument.

The backlash system 180 is provided in order to assure that rotation of shaft 75 follows exactly the rotation of shaft 39 as determined by the gear ratios present between these two shafts. As illustrated, a circular recess 181 is provided in the upper surface of the main reduction gear 55. A first backlash reduction gear 182 is rotatably mounted on shaft 39 above recess 181 and is secured axially relative to shaft 39 by a retaining ring or clip 183. First backlash reduction gear 182 has a pitch diameter equal to that of first reduction gear 55. The first backlash reduction gear 182 meshes with a first backlash pinion 185 rotatably mounted to shaft 65 between a shoulder 186 and a retainer clip or ring 187. A second backlash reduction gear 188 is disposed concentric to axis of shaft 65 and is mounted for rotational movement relative to shaft 65, but is secure from axial displacement relative to the first backlash pinion 185. In view of the requirements for the operation of the device, it is most convenient if the second backlash reduction gear 188 is shrunk or press-fit to a hub 189 of first backlash pinion 185. A second backlash pinion 190 is mounted on shaft 75 and is secured from axial and angular displacement relative to shaft 75.

A spring 193 is positioned within the recess 181 of the main reduction gear 55. The spring 193 has oppositely extending lugs or extensions at opposite ends thereof engaged within suitable sockets of the main reduction gear 55 and the first backlash reduction gear 182. The spring 193 is resiliently preloaded in its installation between first reduction gear 55 and first backlash reduction gear 182 such that the backlash gear train comprised of gears 182, 185, 188, and 190 is loaded against the main gear train comprised of gears 55, 66, 69, and 72. Because of the counter-bias between these two gear trains, any rotation manifested at shaft 39 is exactly transferred to shaft 75. It should be apparent that the pitch diameters of gear pairs 55 and 182, 66 and 185, 69 and 188, and 72 and 190 are substantially identical to prevent binding of the gear trains.

Having reference to FIGURE 3, a backlash gear train 195 is provided in the metric embodiment 130 of the invention. A main backlash reduction gear 196 is rotatably journalled about primary shaft 139 and is resiliently biased relative to shaft 139 by a spring 197. Main backlash gear 196 engages a first backlash pinion 198 rotatably biased relative to shaft 139 by a spring 197. Main backmounted upon the first intermediate shaft 165. A second backlash reduction gear 199 is also rotatably journalled on the first intermediate shaft 165, preferably in a manner so as to move with the first backlash pinion 198. A second backlash pinion 200 and a third backlash reduction gear 201 are rotatably journalled to a second intermediate shaft 170 and preferably are connected so that they move together. The backlash pinion 200 is engaged with the second backlash reduction gear 199. The third backlash reduction gear 201 is engaged with a pinion disposed along the secondary shaft 175. This pinion gear is secured from angular displacement relative to shaft 175.

As illustrated particularly in FIGURE 3, the third drive reduction gear 172 and the third backlash reduction gear 201 are disposed adjacent one another so as to engage a common pinion 173 on shaft 175. It is within the scope of this invention, however, that the gears 172 and 201 may be engaged with their own pinions, each of which is secured from angular displacement on shaft 175.

In order to assure that foreign particles and shop sediment do not adhere to the measurement surface 63 to interfere with the operation of the accessory 10, a wiper 205 is fixed to the front face 19 of the housing 11. The wiper 205 comprises a sheet of compressible wiper material 206 having an aperture 207 in its central portion so that it surrounds the portion of the contact surface 60 projecting through the opening 23 in the front face 19 of housing 11 on at least three sides. The compressible wiper material 205, preferably fabricated from dense felt material, is glued or bonded to the front face 19.

Spring means are provided between the housing 11 and the wiper material 206 to urge the ends of the wiper material outwardly from the housing against the measurement surface 63. As illustrated in FIGURE 1, a pair of spring clips 208 are secured within recesses 209 provided in the front portion of the housing 11. For example, the upper housing element 12 is recessed from its mating surface to its upper surface 14. The lower housing element 13 has an upstanding or vertical pedestal 210 engageable within the recess 209. The spring element 208, preferably formed in configuration of a substantially square geometrical shape, is engaged over the pedestal 210 before the housing portions 12 and 13 are secured together. The spring 208 is configured such that it normally tends to bias the lateral ends of the felt strip 206 away from the housing 11.

In the foregoing description and explanation of the accessory, it has been described how a highly accurate, fine precision measuring instrument of the friction wheel type is possible by virtue of our unique and novel combination of apparatus which accomplishes an end not achieved by devices known heretofore. The maintenance of proper alignment between the shafts of the accessory 10 or 130, as well as the inclusion of the backlash gear trains previously described, contributes significantly to the ultimate accuracy of the instrument. However, such provisions are not the only considerations leading to ultimate accuracy of the device. The diameter of the tracking surface has to be quite accurately fabricated so that the circumference of the surface is as close to the requisite N number of measuring units in length as is possible. Additionally, resistance to torsional and bending loads imposed on the housing 11 is necessary in order that the contact surface 60 does not become misaligned relative to the instrument nor that the shafts become misaligned relative to their axes such that the pitch diameters of the gears internally of the housing change to vary the ultimate gear ratio between the main shaft 39 and secondary shaft 75. It is acknowledged that the error induced by such torsional and bending moments may be small, but it must be remembered that any error inherent in the mechanism is cumulative with each rotation of the main shaft 39.

While the accuracy and precision of the mechanism internally of housing 11 is a major consideration in the successful practice of this invention, there is another aspect of this invention which has not heretofore been recognized, but which, in the case of our apparatus, has been recognized and solved. This problem relates to the mounting of the accessory 10 relative to the measurement surface 63 along which measurements are to be sensed by rotation of the contact surface 60 thereagainst. To illustrate, if the plane of rotation of the tracking surface 60 is inclined relative to its direction of travel, the tracking surface will tend to move along a trigonometric component of the actually travelled distance. If the axis of the main shaft 39 is inclined approximately two degrees or so from the plane of travel of the instrument generally, then, while the actual travel will be along the defined plane, the instrument will not sense a component equivalent to the actual distance traveled multiplied by a difference between unity and the cosine of the angle of error (1—.99939). While it is acknowledged that such a trigonometric component of the actual travel of the instrument is small, over a cumulative distance of, say, four or five feet traversed by the carriage of the machine tool relative to the bed, such a factor is manifested in significant terms and leads to intolerable error. Therefore, the axis of shaft 39 must be maintained exactly perpendicular to the plane of travel of the instrument.

In other situations, if the plane of rotation of contact surface 60 is inclined above or below the plane normal to the measurement surface 63 and parallel to the plane of travel of the instrument 10, additional errors will be manifested in the device. One method of overcoming such an error would be to provide a knife edge for contact surface 60. However, the provision of a knife edge would mean that over an extended period of use, the sharpness of the knife edge would become eroded, irregular and reduced in diameter such that the accuracy of the device would suffer greatly.

If a line perpendicular to and intersecting all the axes of the shafts 39, 65, and 75 remains in the plane of travel of the instrument but is inclined relative to a normal to the measurement surface 63, then the characteristics of the instrument traveling in one direction relative to the measurement surface may be different than when the instrument travels in the opposite direction relative to the measurement surface 63.

Figures 4, 5:
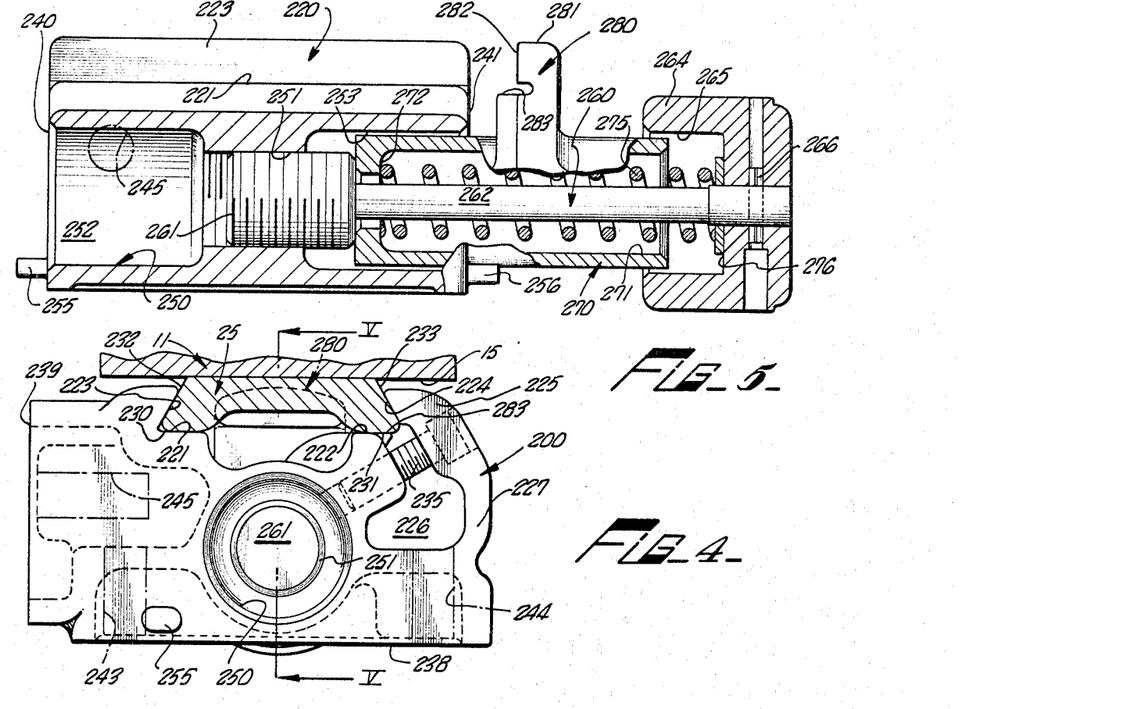
FIG. 4 is an end view of a mounting block for the accessory illustrating the lower portion of the accessory housing engaged within the mounting block.
FIG. 5 is a cross-sectional view of the mounting block as taken along line V—V of FIG. 4.

In order to assure that the mounting or positioning of the housing 11 relative to the measurement surface 63 is according to the criteria specified above, the invention further includes a mounting block or member 220. The mounting block 220 defines a longitudinal channel in its upper portion adapted for reception of the base plate 25 of the housing 11. The channel portion of mounting block 220 comprises a pair of coplanar surfaces 221 and 222 spaced apart from one another along the longitudinal center line of the mounting block. Inclined surfaces 223 and 224 extend upwardly and inwardly toward one another from the opposite extents of surfaces 221 and 222, respectively. The inclined surface 224 is provided on a deformable lug or extension 225 formed integral with the mounting block 220. This deformable lug is defined by a cavity or recess 226 extending longitudinally of the mounting block. A thin walled section 227 connects the guide surface 224 to the mounting block 220 and it is in this thin walled section 227 that deflection occurs.

The base plate 25 fixed to the underside of housing 11 comprises rigid guide protrusion means of the housing and has a pair of coplanar surfaces 230 and 231 aligned parallel with the undersurface 15 of housing 11 and spaced therefrom. A pair of inwardly and upwardly extending surfaces 232 and 233 extend from the lower surfaces 230 and 231, respectively, toward the housing undersurface 15. Such a configuration of the housing base plate 25 defines a male dovetail member perpendicular to the front face 19 of housing 11; the channel in the upper portion of the mounting block 220 comprises a female dovetail member.

The side wall 224 of the female dovetail portion is adjustable relative to the male dovetail inserted within mounting block 220 by means of screws 235 having their heads engaged with the lug 225 but having their threaded portions extending into and engaged within the body of the mounting block 220.

The mounting member 220 has a planar lower surface 238, a planar side surface 239, and end surfaces 240 and 241, the side, bottom, and end surfaces being disposed at right angles to one another. Preferably the lower channel surfaces 221 and 222 are parallel to the bottom surface 238. A pair of internally tapped or threaded holes 243 and 244 are provided in the mounting block 220 perpendicular to the base surface 238. Preferably the holes 223, 224 are spaced transversely of the mounting member. A similar pair of internally tapped holes 245 are formed perpendicular to the side surfaces 239. These holes 243, 244, and 245 permit the mounting bracket member 220 to be secured to a foundation, with the foundation disposed either against the bottom 238 or side surface 239 of mounting bracket 220.

A longitudinal bore 250 is provided through the mounting member 220 and extends between the end surfaces 240 and 241. The bore 250 has a central reduced diameter portion 251 which is internally threaded. The reduced diameter portion 251 defines spaced-apart cylinder or sleeve recesses 252 and 253. A lug 255 extends from the mounting block end surface 240 adjacent the lower surface 238; a similar lug 256 is formed on the mounting block along the opposite end surface 241.

The portions of the mounting block 220 described thus far are symmetrical about a plane transversely of the mounting block through the center of the reduced diameter portion 251 of bore 250. It is thus possible to side mount the mounting block to a foundation from either the right or left side merely by transposing the connection of the rod 260 to be described below.

A tie rod 260 has an enlarged diameter externally threaded head 261 engaged within the internally threaded reduced diameter portion 251 of bore 250. The tie rod 260 has a reduced diameter portion 262 extending from the threaded head 261 to an accessory bias adjusting knob 264. The knob has an internal recess 265 concentric to tie rod 260 which opens toward the end of the knob disposed toward the tie rod head 261. The recess 265 preferably is of the same diameter as the cylinder cavities 252 and 253. The adjusting knob 264 is secured from axial displacement relative to the tie rod 262. Many conventional methods of securing the tie rod to the knob are possible, but in FIGURE 5 a dowel 266 through tie rod 260 is utilized.

A hollow sleeve or cylinder 270 is engaged over the reduced diameter portion 262 of the tie rod 260. The sleeve has a longitudinal internal bore 271 extending from its end adjacent knob 264. An internal annular rim 272 is provided in the bore 271 adjacent the tie rod head 261. The external diameter of sleeve or cylinder 270 is less than the diameter of the cavities 251, 253, and 265.

A compression spring 275 is disposed coaxially of the tie rod 262 internally of the sleeve bore 271 and abuts between the inner annular rim 272 of sleeve 270 and the base surface 276 of knob cavity 265. The compression spring is continually in compression even when the tie rod head 261 is engaged with the adjacent end of the sleeve 270.

A radial finger 280 extends laterally from the midlength of the sleeve 270. The finger 280 has an end 281 which, when positioned adjacent the channel in the upper portion of mounting block 220 (see FIGURE 5), does not extend beyond the upper extent of the mounting block 220. (Such dimensional qualities provide clearance between the underside of the housing 11 and the finger 280 when resilient biasing of the accessory 10 relative to the mounting block 220 is desired.) The finger 280 has a planar base plate engaging surface 282 disposed toward the mounting block 220. The plane of surface 282 is perpendicular to the axis of sleeve 270 and tie rod 260.

The lug or finger 280 further has a cylindrical surface 283 on a reduced radial portion disposed intermediate the finger surface 282 and the adjacent end 241 of the mounting block 220. It should be mentioned that a cylinder, as the term is used here, is not necessarily circular, but rather is that surface generated by a line moving in space at all times parallel to a fixed reference line. FIGURE 4 illustrates the preferred configuration of surface 283. The positioning of stop lugs 255 and 256 with respect to the bore 250 is such that, as the sleeve 270 is rotated about the tie rod 260, the surface 283 does not clear these lugs. The significance of these geometric relationships of the finger 280 will become more apparent by description of the operative cooperation between the mounting 220 and the housing 11.

Let it be assumed that the accessory 10 is to be used to measure the travel of an engine lathe carriage relative to the ways or bed of the lathe. A foundation for the mounting block 220 is provided on the carriage such that the upper surface of the foundation is perpendicular to the ways and parallel to the direction of travel of the carriage. The construction of the foundation for the mounting block is not considered in this invention since different machine tools will require different foundations. (Alternatively, the foundation may provide a surface perpendicular to the surface defined so as to receive surface 239 of mounting block 220.) It is considered that it is well within the scope of the ability of a user of this invention to provide a proper and suitable foundation. Once a foundation has been provided, the mounting block 220 is secured to the foundation by abutting the base surface 238 of the mounting block with the foundation. The bottom land surfaces 221 and 222 of the mounting block channel should be parallel to the plane of travel of the carriage.

The adjustment knob 264 then is rotated until, in a preferred embodiment of the invention, approximately a one-quarter (¼) inch clearance exists between the end surface 241 of the mounting block 220 and the base engaging surface 282 of finger 280. In such a position the reduced radius portion of finger 280 abuts finger or lug 256. In rotating the knob 264 without the instrument 10 engaged within the mounting block 220, the knob 264, the tie rod 260, and the sleeve 270 move as a unit such that there is no change in the compression in spring 275. Once the clearance has been determined between the mounting block and the finger 280, the finger is rotated relative to the tie rod 262 such that the finger is stopped or positioned by lug 256. The measurement accessory 10 is then engaged within the mounting block by interengagement of the cooperating guide elements as illustrated in FIGURE 4.

It should be noted at this point that the mounting block 220 should have been pre-positioned relative to the measurement surface or way surface 63 so that the accessory may be slid relative to the mounting block so that the rear end of the housing base plate 25 is less than one-quarter inch from the rear surface 241 of the mounting block. In other words, it should be possible to slide the accessory forward relative to the mounting block 220 such that when the knob 264 is rotated, the finger 280 assumes the position illustrated in FIGURE 2 In such a situation, the surface 283 abuts against the base plate channel surface 231 and finger 280 is perpendicular to the underside 15 of housing 11 and clears surface 15. Such a situation is illustrated in FIGURE 4.

The adjustment knob 264 is then rotated so that the tie rod head 261 becomes increasingly engaged with the reduced diameter portion 251 of the mounting block bore 250. At some point during such rotation of knob 264, the vertical abutment surface 282 of finger 280 will engage the rear of the housing base plate 25. Further rotation of the adjustment knob 264 forces the housing 11 to slide relative to the mounting block 220 with deformation of spring 275 until the contact surface 60 of the accessory 10 is engaged with the measurement surface 63.

In order to prevent undue friction between the male and female dovetail elements, the surface 224 of mounting block 220 is adjusted relative to surface 223 by screws 235. Undue friction would cause spring 275 to deflect before contact surface 60 engages measurement surface 63 and the proper engagement force therebetween would be difficult to obtain.

As soon as the precision contact surface 60 abuts the measurement surface 63, further rotation of the adjustment knob 264 causes increased compressive force to be induced in the spring 275. The spring constant or stiffness rate of the spring 275 is such that, in conjunction with the pitch of the threads of the tie rod head 261, one complete rotation of the adjustment knob 264 after such contact between surfaces 60 and 63 imposes the desired compressive force between the contact surface 60 and the measurement 63. In a preferred form of this invention, such an engagement force is on the order of forty pounds. It has been found that this force assures accurate tracking of the contact surface 60 relative to the measurement surface 63 without unduly loading the bearings 40 and 41 of the main shaft 39. Too small a contact force would mean that slipping of the contact surface relative to the measurement surface might occur and errors in the indications of the accessory might result. Also, too high a compressive force built up in the spring 275 would lead to wear and deformation within the moving parts of the accessory.

The dimensions defining the interfitting dovetail elements of the base plate 25 and the mounting block 220 are such that there is no play between these parts. The alignment of the channel defining the female dovetail portion is closely perpendicular to the measurement surface 63 if the mounting block 220 has been properly installed on its particular foundation. Therefore, when the housing 11 is engaged within the mounting block 220, proper alignment of the accessory 10 relative to measurement surface 63 is achieved.

The screws 235 engaged between the mounting block lugs 225 and the mounting block body provide for fine adjustment of the dimensions of the female dovetail such that the accessory 10 may be conveniently removed from the mounting block 220, and that an undue portion of the compressive load built up in spring 275 is not wasted in friction between the mounting 220 and the housing 11.

When the measuring accessory 10 provided by this invention is installed for indication of travel relative to a measurement surface, such as surface 63, it is intended that the instrument remain continuously engaged with the surface except when it is intended that the instrument be removed for transfer to a different environment. If the accessory is utilized, say, on an engine lathe wherein many different types of machining operations may be carried out, it is possible to "zero" the instrument when changing from one production technique to another. As mentioned above, it is desirable if the engagement force between the precision contact surface 60 and the measurement surface 63 is maintained at approximately a forty pound level. Such engagement means shaft 39 cannot rotate. To zero the instrument in such a situation, the knob 81 associated with the first shaft measurement indicator 80 is merely rotated until the zero indication on scale 85 is aligned with the engraved scale referencer mark 86. This is possible because of the resiliently biased friction clutch apparatus contained within cap 81.

In a similar manner, the secondary measurement indicator 100 may be zeroed by rotating the bezel ring 114 relative to the secondary shaft 75 because of the resiliently biased frictional engagement between the bezel ring 114 and the housing 11 provided by the wave-washer 117. When the instrument is then utilized by traversing the carriage of the machine tool relative to the base of the tool, the primary shaft measurement indicator 80 is completely operative because the frictional engagement between the retainer ring, the washer 93, wave-washer 95, and collar 89 assures that the cap 81 rotates exactly with rotation of the primary shaft 39.

It has been specified that a desirable feature of the accessory 10 is that it be readily transferable from one machine tool to another so that, particularly in small machine shops, one accessory 10 may serve many functions. Such transferability is derived from the novel cooperation between the base 25 and the mounting block 220. If the instrument is installed on one machine tool, it may be conveniently removed therefrom merely by withdrawing the finger 280 of the mounting block sleeve 270 from engagement with the housing base 25. If the mounting block has been properly adjusted, the male dovetail portion of base 25 may be easily withdrawn from the female dovetail of the mounting block 220. It is preferred that a second mounting for the accessory already be installed on the machine tool to which the accessory is to be transferred. Therefore, where a plurality of mounting blocks 220, each specifically adapted to its own unique foundation, are provided in a machine shop, one instrument 10 may find extremely wide use.

From the foregoing detailed description and explanation of the invention it may be seen that this invention provides a highly accurate and long-lasting machine tool measurement accessory of a type which has not been satisfactorily achieved before this invention. Many factors contribute to the success and operability of this invention. Not the least of such factors is the discovery and utilization of the relation between the engagement force, between the contact surface 60 and a measurement surface 63, and the life of the instrument. If the engagement forces are too high, too much of an eccentric load will be exerted upon the bearings of primary shaft 39 and precision performance required in such an instrument will be destroyed in a relatively short time. However, a competing factor with the requirement to maintain accuracy is that some force is necessary because, if a proper contact force is not provided, then the contact surface 60 will slip and skip relative to the measurement surface 63. This invention contains, so far as is known, the first recognition of this critical factor in such friction wheel type measuring instruments.

The foregoing detailed description and explanation of this invention has been had in conjunction with specific structural configurations; this has been largely by way of example and is not to be considered as limiting the scope of this invention.

What is claimed is:

1. A mounting apparatus for a friction wheel measuring device, the device comprising a housing having a front face, the housing including a rotatable precison diameter contact surface protruding beyond the front face, means associated with the housing for indicating the rotation of the contact surface relative to a measurement surface adjacent which the housing is disposed, the housing further defining a rigid elongate protrusion means on a lower surface of the housing, the protrusion means extending perpendicular to the front face of the housing portion beyond which the contact surface protrudes, the mounting apparatus comprising a mounting block connectible to a member relative to which the measurement surface moves, the mounting block defining in an upper portion thereof a channel means slidably engageable with the housing protrusion means, the channel means being oriented perpendicular to the measurement surface when the mounting block is connected to the member relative to which the measurement surface moves, means for adjusting the slidable engagement between the housing protrusion means and the mounting block channel means, the mounting block having a threaded bore adjacent the channel means, an elongate rod having one end engaged within the threaded bore and an opposite end disposed away from the mounting block, a hollow member axially movable relative to the rod disposed around the rod, resilient means disposed between the rod and the hollow member normally to urge the hollow member toward the mounting block, a portion of the hollow member comprising a portion engageable with the housing protrusion means when the protrusion means is engaged in the mounting block channel portion, the rod being axially adjustable within the bore for selectively determining the force in the resilient means, which force is transferred to the housing protrusion means to urge the housing toward the engagement surface so that contact between the contact surface and the measurement surface is achieved and maintained.

2. A mounting apparatus according to claim 1 including a knob secured to the opposite end of the rod, wherein the resilient means is a compression spring disposed between the hollow member and the knob.

3. A mounting apparatus according to claim 2 wherein the bore has an enlarged diameter portion within which the hollow member is engageable.

4. A mounting apparatus according to claim 2 wherein the bore is oriented below, centrally of, and parallel to the mounting block channel portion, and wherein the bore has a central reduced diameter portion defining spaced apart enlarged diameter portions within one of which the hollow member is selectively engageable in conjunction with a predetermined orientation of the mounting block relative to the member relative to which the measurement surface moves.

5. In apparatus for indicating motion between two relatively movable parts of a machine tool and the like, one of said parts having a measurement surface, the apparatus including a metering assembly having a housing, a shaft rotatably mounted in the housing, and a metering wheel mounted on the shaft for rotation therewith and extending beyond said housing to enable frictional rolling engagement with the measuring surface, the improvement in mounting means adapted to mount the metering assembly to the other part of the machine tool so that the portion of the metering wheel which extends beyond the housing engages the measurement surfaces in frictional rolling contact and to urge the wheel into said engagement with the measuring surface so that the wheel rotates faithfully in response relative to movement between the two parts of the tool, the mounting means comprising a male dovetail member connected to an exterior surface of the housing and having planar side surfaces converging toward the said exterior surface of the housing, the planes of the converging surfaces lying perpendicular to the plane of the housing surface beyond which the periphery of the metering wheel extends, the male dovetail member further defining a planar surface parallel to the plane of rotation of the metering wheel, a mounting block for the metering assembly engageable with the male dovetail member, the mounting block having a female dovetail channel in an upper portion thereof, the female dovetail defining means engageable with the planar surface of the male dovetail portion which is parallel to the plane of rotation of the metering wheel and spaced apart converging inclined surfaces engageable with the converging surfaces of the male dovetail member, one of the mounting block inclined surfaces being included on a portion of the mounting block deformable relative to the remainder of the block, means for adjusting and preselecting the deformation of said portion relative to the remainder of the block, the block defining an axial bore therethrough parallel to the means engageable with the planar surface of the male dovetail which is parallel to the plane of rotation of the metering wheel, the bore having a threaded reduced diameter portion centrally thereof defining spaced apart enlarged diameter portions of the bore adjacent each end thereof, a tie rod having an enlarged diameter end threadably engaged within the reduced diameter portion of the bore, the tie rod having a reduced diameter portion extending from one of the enlarged diameter portions of the bore, a knob secured to the reduced diameter portion of the tie rod at a location remote from the tie rod enlarged end, the knob having a cavity therein concentric to the tie rod and opening toward the tie rod enlarged end, a sleeve having an annular bore therein engaged concentric with the reduced diameter tie rod portion, the external diameter of the sleeve being less than the diameter of the enlarged diameter portions of the mounting block bore and less than the diameter of the knob cavity, a compression spring engaged axially of the tie rod reduced diameter portion within the sleeve bore between the sleeve and the knob normally to urge the sleeve against the tie rod enlarged end, the sleeve being rotatable relative to the tie rod; a finger extending radially of the sleeve intermediate the ends of the sleeve, the finger defining a planar surface lying in a plane perpendicular to the axis of the tie rod, the finger having a reduced diameter portion disposed between the said planar surface and the tie rod enlarged end, and a lug extending from the mounting block adjacent each enlarged diameter portion of the bore, the distance of the lug from the axis of the bore being less than the radial distance of the reduced diameter portion of the finger from the axis of the tie rod.

6. In a measuring accessory for a machine tool having a metering wheel rotatably mounted in a housing and extending outwardly therefrom for frictional rolling engagement with a surface of a first part of a tool, indicating means coupled to the wheel and responsive to rotation thereof for indicating the distance the housing moves relatively along the surface, and a mounting assembly for securing the accessory to a second part of the tool, the improvement comprising, in combination, an elongated straight guide protrusion defining a male part of a dovetail connection and connected rigidly to the housing, the guide protrusion being aligned parallel to a line passing through the wheel axis of rotation and the point of farthest extension of the wheel from the housing, a mounting block defining a female portion of a dovetail connection in which the guide protrusion is slidably and yet releasably engageable, the female portion of the dovetail being disposed normal to the surface with which the metering wheel is engaged, a lug member mounted to the mounting block for reciprocal motion relative thereto parallel to the direction of slidable movement between the dovetail portions and for releasable engagement with the end of the guide protrusion remote from the metering wheel, resilient means biasing the lug member relative to the mounting block, and means for imposing on the resilient means a predetermined load, the lug member and the guide protrusion being cooperatively arranged to transfer the predetermined load to the housing and to the metering wheel so that the metering wheel is forcefully frictionally engaged with the surface so that the wheel rotates solely and faithfully by reason of said frictional engagement in response to relative movement of the housing along the surface and the indicating means accurately measures said movement.

7. In a measuring accessory for a measurement tool having a metering wheel rotatably mounted in a housing and extending outwardly therefrom for frictional rolling engagement with a surface of a first part of a tool, indicating means coupled to the wheel and responsive to rotation thereof for indicating the distance the housing moves relatively along the surface, and the mounting assembly for securing the accessory to a second part of the tool, the improvement comprising, in combination, an elongated straight male guide connection protrusion connected permanently and rigidly to the housing, the male protrusion being aligned parallel to a line passing through the wheel axis of rotation and the point of farthest extension of the wheel from the housing, a mounting block defining an elongate female connection receptacle for the male protrusion in which the male guide protrusion is slidably and yet releasably engageable, means for mounting the mounting block to the tool second part so that the female connection receptacle has its elongate extent disposed normal to the surface with which the metering wheel is engaged, a lug member mounted to the mounting block for reciprocal motion relative thereto parallel to the direction of slidable movement between the male protrusion and the female receptacle and for releasable engagement with the end of the male guide protrusion remote from the metering wheel so that the male protrusion can be slid out of the female receptacle relative to the mounting block past the lug member, resilient means biasing the lug member relative to the mounting block, means for imposing on the resilient means a predetermined load, the lug member and the male guide protrusion being cooperatively arranged to transfer the predetermined load to the housing and to the metering wheel so that the metering wheel is forcefully frictionally engaged with the surface so that the wheel rotates solely and faithfully by reason of said frictional engagement in response to relative movement of the housing along the surface and the indicating means accurately indicates said movement.

8. Apparatus according to claim 7 including adjustable means for biasing said predetermined load into the resilient means.

References Cited

UNITED STATES PATENTS

| | | | |
|---|---|---|---|
| 968,884 | 8/1910 | Reisner | 33—172 |
| 1,433,076 | 10/1922 | Green | 33—172 |
| 2,105,703 | 1/1938 | Self | 33—125 |
| 2,663,598 | 12/1953 | Verderber | 33—141 |
| 2,881,527 | 4/1959 | Walter et al. | 33—125 |

FOREIGN PATENTS

| | | |
|---|---|---|
| 988,522 | 8/1951 | France. |
| 866,253 | 2/1953 | Germany. |
| 474,080 | 8/1952 | Italy. |

WILLIAM D. MARTIN, JR., *Primary Examiner.*